United States Patent [19]

Sasaki

[11] Patent Number: 5,499,092
[45] Date of Patent: Mar. 12, 1996

[54] METHOD AND A COLOR IMAGE FORMING APPARATUS FORMING A POSITIONING MARK

[75] Inventor: Eiichi Sasaki, Sagamihara, Japan

[73] Assignee: Ricoh Company, Ltd., Tokyo, Japan

[21] Appl. No.: 219,352

[22] Filed: Mar. 29, 1994

[30] Foreign Application Priority Data

Apr. 5, 1993 [JP] Japan .................................... 5-077956

[51] Int. Cl.$^6$ .................................................. G03G 15/01
[52] U.S. Cl. ..................... 355/326 R; 347/116; 347/248; 355/208; 355/275
[58] Field of Search ..................................... 355/271, 275, 355/274, 326 R, 327, 208, 317; 347/248, 154, 116

[56] References Cited

U.S. PATENT DOCUMENTS

| | | | |
|---|---|---|---|
| 4,847,660 | 7/1989 | Wheatley, Jr. et al. | 355/326 R |
| 4,965,597 | 10/1990 | Ohigashi et al. | 355/327 X |
| 4,984,029 | 1/1991 | Nishikawa | 355/317 X |
| 5,019,859 | 5/1991 | Nash | 355/326 X |
| 5,063,398 | 11/1991 | Murai et al. | 355/327 X |
| 5,164,783 | 11/1992 | Taguchi et al. | 355/327 |
| 5,175,585 | 12/1992 | Matsubayashi et al. | 355/208 |
| 5,313,252 | 5/1994 | Castelli et al. | 355/271 X |

OTHER PUBLICATIONS

Xerox Disclosure Journal, vol. 18, No. 3, May/Jun. 1993, pp. 257–259, Kenneth R. Ossman, "Color Printer Employing Fiducial Mark for Registration Correction".

*Primary Examiner*—A. T. Grimley
*Assistant Examiner*—Shuk Y. Lee
*Attorney, Agent, or Firm*—Oblon, Spivak, McClelland, Maier & Neustadt

[57] ABSTRACT

In a color image forming apparatus, a latent image forming device selectively forms on a photoconductive element images respectively corresponding to images of particular colors and a position mark latent image representative of position information. A developing unit develops the latent images with developers of respective colors to thereby produce corresponding color images, and develops the position mark latent image to thereby produce a position mark. The color images are transferred to an intermediate transfer belt one above another and then transferred to a recording medium. The position mark is also transferred to the transfer belt to form a position information portion. A position information detecting device generates a detection signal on detecting the position information portion formed on the transfer belt. A starting device starts forming a latent image on the photoconductive element in response to the detection signal. The apparatus is capable of forming a high definition full-color image free from color displacements, and reducing the total printing time.

9 Claims, 8 Drawing Sheets

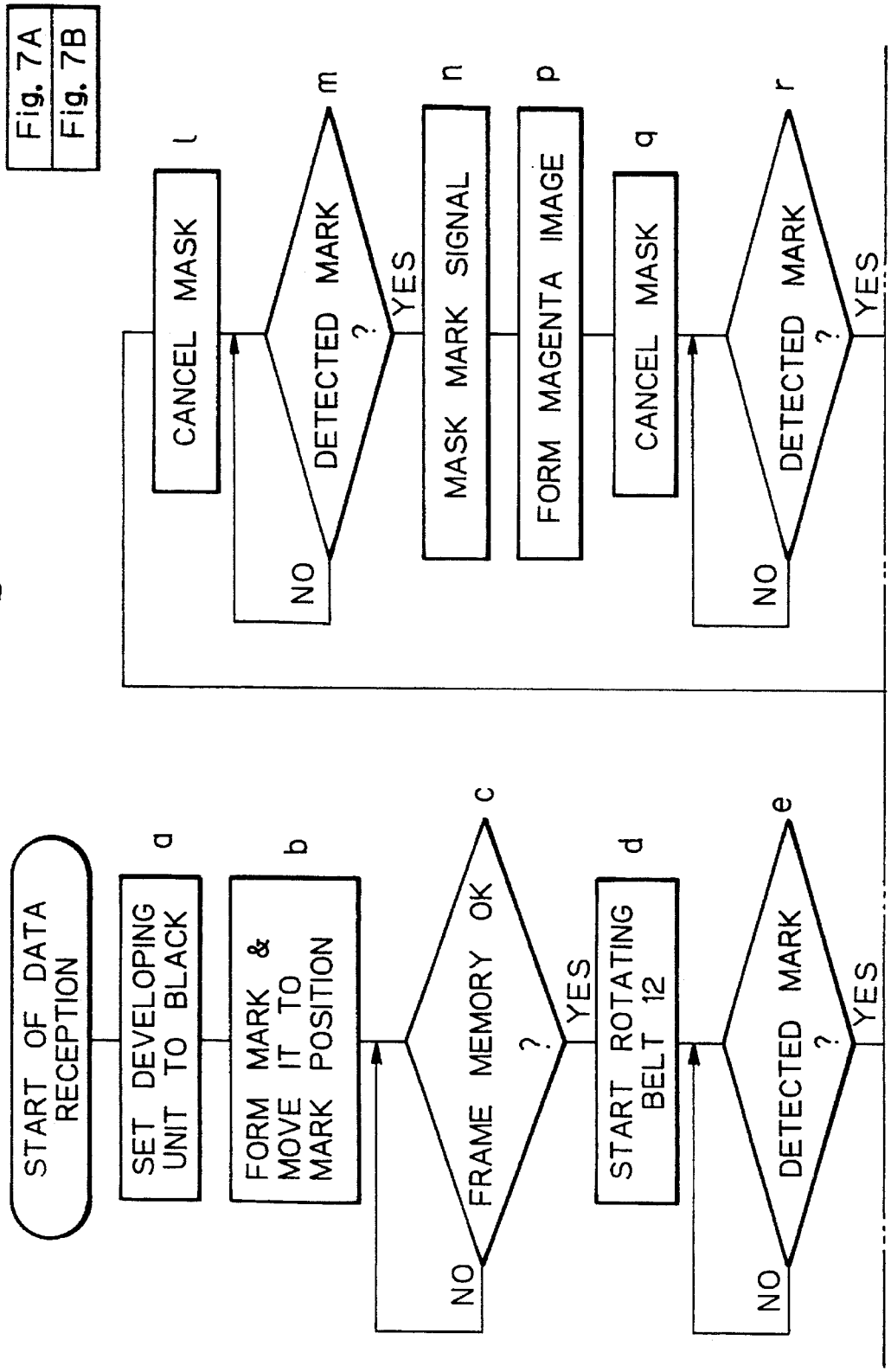

METHOD AND A COLOR IMAGE FORMING APPARATUS FORMING A POSITIONING MARK

BACKGROUND OF THE INVENTION

1. Field of the Invention

The present invention relates to a color copier, color printer, color facsimile apparatus or similar color image forming apparatus.

2. Discussion of the Background

Conventional color image forming apparatuses include one having an intermediate image transfer belt, a photoconductive belt, and motors each for driving the respective belt, as taught in, for example, Japanese Patent Laid-Open Publication No. 62-182766. The motors are driven in synchronism with each other so as to transfer toners of different colors onto the transfer belt one above another. This type of apparatus has some problems left unsolved, as follows. To begin with, a plurality of motors increase the cost of the apparatus and, moreover, have to be accompanied by a complicated mechanism for the synchronization thereof. Further, the apparatus is not provided with a process system for minimizing the time interval between the print enable state and the following print start state, i.e., for reducing the total printing time. Hence, with this type of apparatus, it is impossible to form a high definition image by taking account of displacements of colors.

SUMMARY OF THE INVENTION

It is, therefore, an object of the present invention to provide a color image forming apparatus capable of forming high definition color images in accurate register.

It is another object of the present invention to provide a color image forming apparatus which reduces the waiting time between the print enable state and the subsequent print start state, thereby reducing the overall printing time.

A color image forming apparatus of the present invention has a latent image forming device for selectively forming on a photoconductive element images respectively corresponding to images of particular colors and a position mark latent image representative of position information. A developing unit develops the latent images with developers of respective colors to thereby produce corresponding color images, and develops the position mark latent image to thereby produce a position mark. The color images are transferred to an intermediate transfer belt one above another and then transferred to a recording medium. The position mark is also transferred to the transfer belt to form a position information portion. A position information detecting device generates a detection signal on detecting the position information portion formed on the transfer belt. A starting device starts forming a latent image on the photoconductive element in response to the detection signal.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
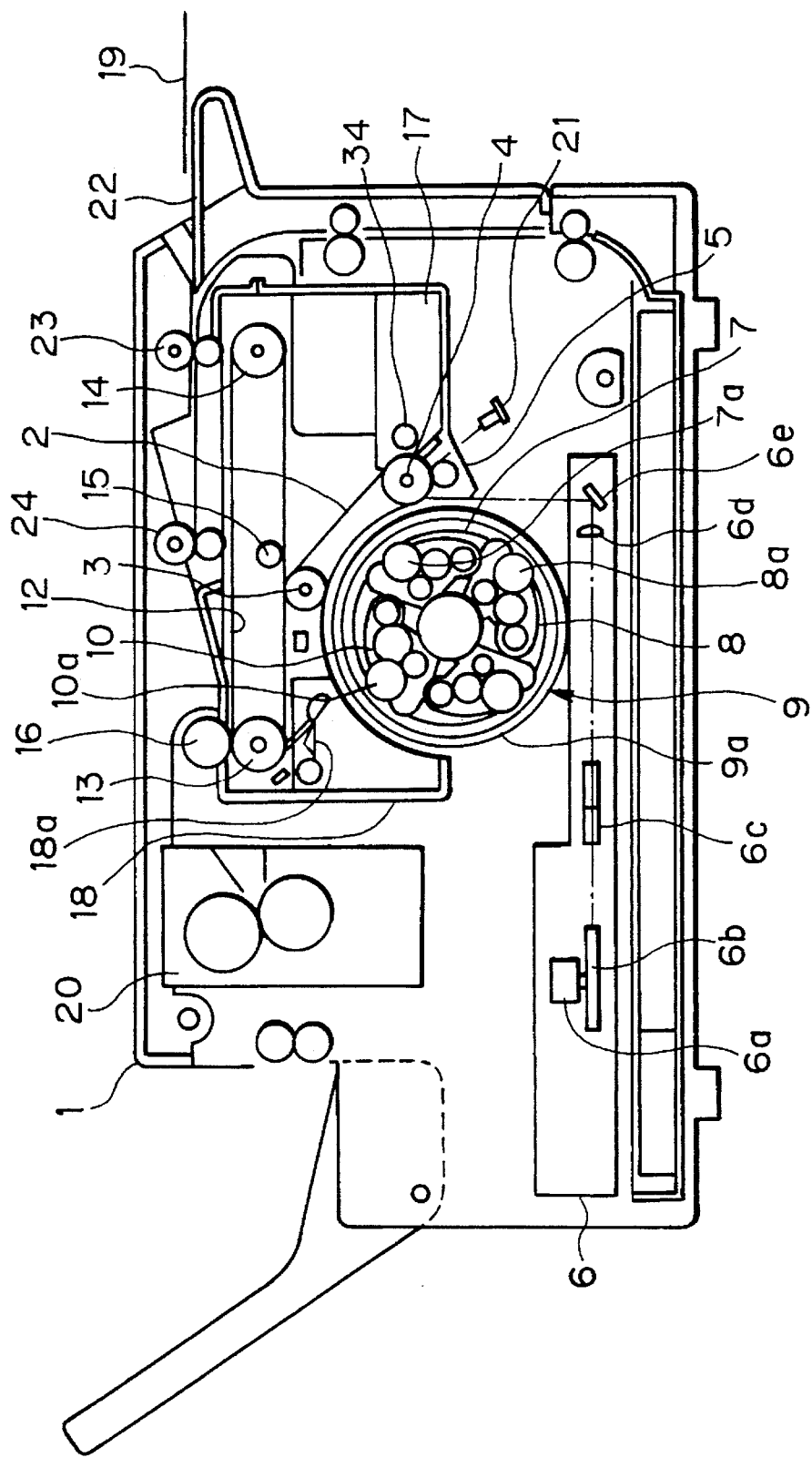
FIG. 1 is a section showing a color image forming apparatus embodying the present invention.

Referring to FIG. 1 of the drawings, a color image forming apparatus embodying the present invention is shown and includes a body or housing 1. A photoconductive element 2 is located at substantially the center of the apparatus body 1 and implemented as a photoconductive belt. The belt 2 is passed over rollers 3 and 4 and driven thereby clockwise as viewed in the FIG. 1. A charger 5 is positioned in close proximity to the part of the belt 2 wrapping around the roller 4. A laser writing unit 6 is disposed below the charger 5 and accommodates a drive motor 6a, a polygon mirror 6b, an f-theta lens 6c, a condenser lens 6d, and a mirror 6e. The laser writing unit 6 has a casing which is formed with a slit for exposure in the upper wall thereof and built in the apparatus body 1. The charger 5 and laser writing unit 6 cooperate as means for electrostatically forming latent images each corresponding to an image of a particular color on the belt 2.

A revolver type developing unit is made up of developing sections 7, 8, 9 and 10 and located in the vicinity of the belt 2. The developing sections 7, 8, 9 and 10 store, for example, a yellow developer, a magenta developer, a cyan developer, and a black developer, respectively. Developing sleeves, or developer carriers, 7a, 8a, 9a and 10a are respectively disposed in the developing sections 7, 8, 9 and 10, and each is capable of adjoining or contacting the belt 2 at a predetermined position. The sleeves 7a–10a, therefore, each develop a respective latent image formed on the belt 2 in or out of contact with the belt 2. A movable support, not shown, supports the developing sections 7, 8, 9 and 10 and selectively brings them to a single developing position.

An intermediate transfer belt 12 is disposed above the photoconductive belt 2 and passed over rollers 13 and 14 to be driven thereby counterclockwise as viewed in FIG. 1. The part of the photoconductive belt 2 wrapping around the roller 3 is held in contact with the transfer belt 2. A bias roller 15 is positioned inside of the transfer belt 12 for transferring the first developed image from the belt 2 to the belt 12. In the same manner, the second to fourth developed images are sequentially transferred from the belt 2 to the belt 12 one above another and in accurate register. A transfer roller 16 is movable into and out of contact with the transfer belt 12.

A cleaning device, or cleaning means, 17 adjoins the photoconductive belt 2 while a belt cleaning device, or belt cleaning means, adjoins the transfer belt 12. The cleaning device 18 has a blade 18a which is pressed against the belt 12, as shown in FIG. 1, in the event of cleaning which follows image transfer, but it is spaced apart from the belt 12 while image formation is under way. A fixing device 20 adjoins the roller 13 in order to fix the developers transferred from the belt 12 to a paper 19.

A color image forming process available with the above-described apparatus is as follows. To begin with, a system for forming a multicolor image before the operation of the laser writing unit 6 will be described, although it is not shown specifically. A color image data input section generates data by scanning an original document. The data is processed by an image data processing section to turn out image data and then written to a video memory. In the event of recording, the data is read out of the video memory and transferred to the laser writing unit or recording section 6. Specifically, when a color signal is output from a scanner physically independent of the printer and fed to the writing unit 6, a laser beam issuing from a semiconductor laser not shown, is steered by the polygon mirror 6b which is rotating by being driven by the motor 6a. As a result, the laser beam is sequentially propagated through the f-theta lens 6c, lens 6d and mirror 6e to reach the photoconductive belt 2. At this instant, the surface of the belt 2 has been discharged by a lamp 21 and then uniformly charged by the charger 5. Consequently, the laser beam electrostatically forms a latent image on the charged surface of the belt 2.

In the above condition, the image pattern to be formed on the belt 2 corresponds to a yellow, magenta, cyan or black pattern to be produced when a desired full-color image is separated. The developing sections 7–10 of the revolver develop the latent images sequentially formed on the belt 2 in yellow, magenta, cyan, and black, respectively. The resulting individual color images are transferred, one above another, from the belt 2 to the belt 12 which is rotating counterclockwise in contact with the belt 2. As a result, a composite yellow, magenta, cyan and black image, i.e., full-color image, is formed on the belt 12. As a paper 19 is fed from a sheet feed table 22 to an image transfer section via a pick-up roller 23 and a registration roller 24, the composite image is transferred from the belt 12 to the paper 19. Subsequently, the image is fixed on the paper 19 by the fixing unit 20.

Figure 2:
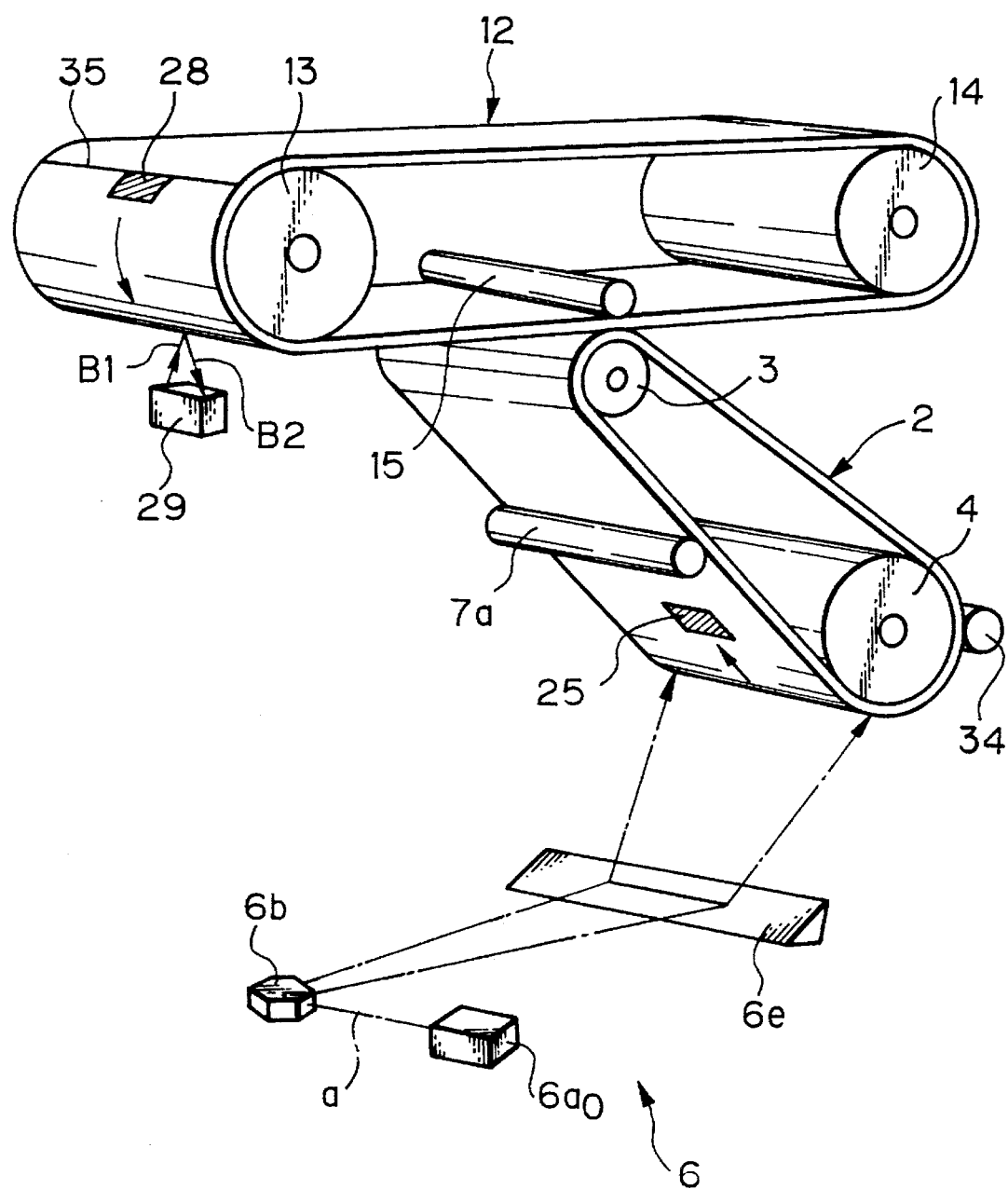
FIG. 2 is a perspective view of a laser writing system forming an essential part of the embodiment.

Specifically, as shown in FIG. 2, a latent image 25 representative of position mark information is formed on the belt 2 and then developed by any one of the developing sections 7–10. The developed image, or mark image, 25 is transferred from the belt 2 to the image forming area of the belt 12 to form a position information mark 28. There are provided in the apparatus means for generating a detection signal on detecting the mark 28, and means for starting forming a latent image on the belt 2 in response to the detection signal. There are also provided in the apparatus means for forming the mark 28 on the belt 12 for each recording medium; means for forming at least one mark 28 on the belt 12 at least once in the event of the start-up of the apparatus and measuring, based on the mark 28, the distance which the belt 12 travels during one turn thereof; means for starting forming an image in, at first, the color used to form the mark 28; means for masking the belt 12, except for the mark 28 and neighborhood thereof, on the basis of the measured distance of one turn of the belt 12; and means for starting writing the mark 28 before image data begins to be written and after the belt 12 has been fed to a position short of a position where the position information detecting means is located. In the illustrative embodiment, a beam issuing from the position information detecting means, which is responsive to the mark 28, is provided with a greater spot diameter than a beam for writing image data on the belt 2. Also, a beam incident to the position information detecting means is provided with a smaller diameter than a beam issuing from the same.

A reference will be made to FIGS. 3–7, as well as to FIG. 2, for describing specific arrangements of the various means stated above. FIG. 2 shows a specific construction of the essential part of the embodiment. As shown, the laser writing unit 6 has a semiconductor laser, i.e., laser diode (LD) 6a$_o$, which issues a laser beam a for writing image data on the belt 2. The laser beam a is steered by the polygon mirror 6b, which is in rotation, and then reflected by the mirror 6e to be incident to the belt 2. In this case, the latent image 25 representative of position mark information is formed on the belt 2, developed by the developing sleeve 7a (or any one of 8a, 9a and 10a) and then transferred to the belt 12 by the bias roller 15 to turn out the position information mark 28. The mark 28 is moved counterclockwise together with the belt 12. A reflection type photosensor 29 plays the role of the position information detecting means and generates a detection signal MK, FIGS. 3 and 4, on detecting the mark 28.

Figure 3:
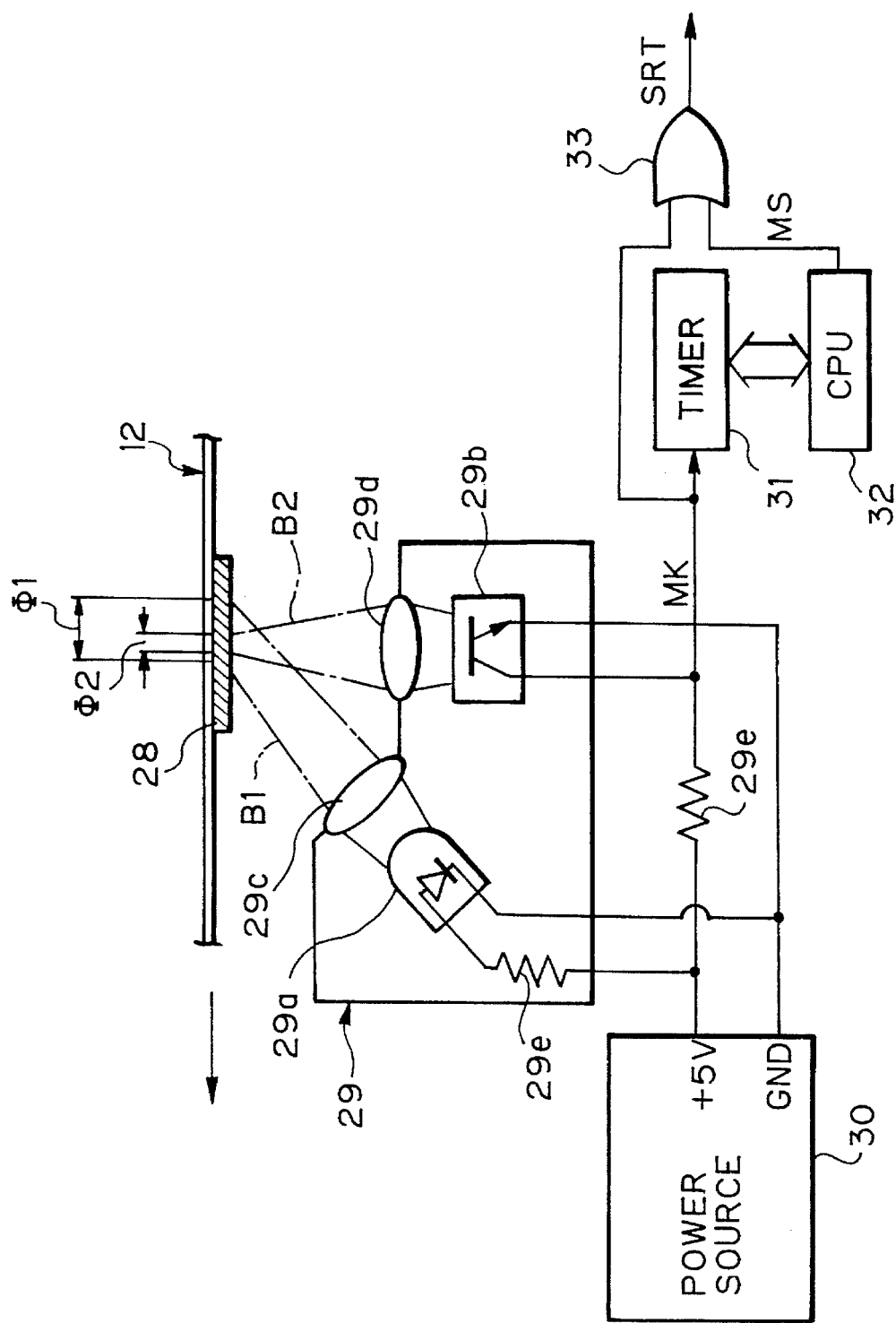
FIG. 3 is a block diagram schematically showing circuitry included in the embodiment for detecting a position mark.

FIG. 3 shows a mark sensor arrangement including the photosensor 29. As shown, the photosensor 29 is made up of an LED (Light Emitting Diode) 29a, a phototransistor 29b, and lenses 29c and 29d. The LED 29a and phototransistor 29b are connected to a +5 V terminal of a power source 30 via a resistor 29e at one end and connected to a ground terminal, not shown, at the other end. A beam B1 issues from the LED 29a toward the mark 28 via the lens 29c at an angle of 45 degrees relative to a line which is perpendicular to the surface of the belt 12 where the mark 28 is present. A beam B2 reflected from the mark 28 is incident to the phototransistor 29b via the lens 29d at an angle of zero degree relative to the line perpendicular to the surface of the belt 12. In the illustrative embodiment, the beam B1 has a spot diameter $\Phi 1$ which is greater than the spot diameter $\Phi 2$ of the beam B2, i.e., approximately $\Phi 1 = \phi 2 * 2$. The transistor 29b turns on or turns off depending on the presence/absence of the mark 28 on the belt 12, thereby producing the detection signal MK. The detection signal, or mark signal, MK is applied to a timer 31 and a gate 33. A CPU (Central Processing Unit) 32 monitors the timer 32 and feeds a mask signal MS to the gate 33 depending on the value of the timer 31. Therefore, the gate 33 outputs the mark signal MK on the basis of the mask signal MS and delivers it as a write start signal STR, thereby causing laser writing to begin. In the embodiment, the spot diameter of the laser beam a and the spot diameter $\Phi 2$ of the beam incident to the phototransistor 29b are 80 μm and 2 mm, respectively. This is successful in leveling off the irregularities in laser writing and irregularities in the deposition of the developers.

Figure 4:
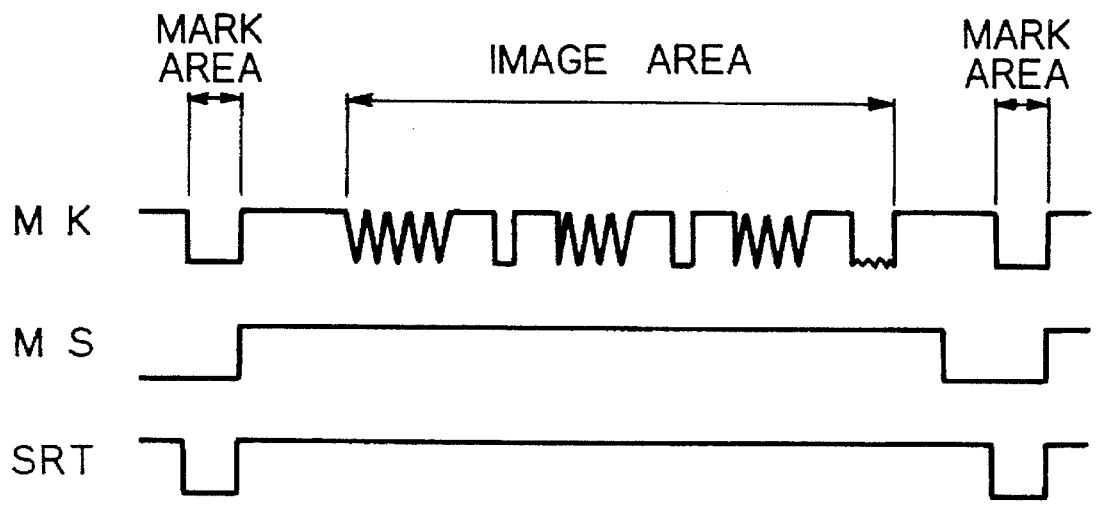
FIG. 4 is a timing chart demonstrating a specific operation of the embodiment.

As shown in FIG. 4, the detection signal or mark signal MK is representative not only of the mark 28 but also of an image existing in the image area of the belt 12. In light of this, the mask signal MS is caused to go high after the mark 28 has moved away from the photosensor 29 and then go low when the mark 28 reaches a position 10 mm short of the position where it will be detected again. It is to be noted that the distance of 10 mm is only illustrative and may be changed so long as the position lies between the trailing end of the image area of the belt 12 and the leading end of the mark 28. Hence, the mask signal MS allows the write start signal STR to represent only the mark 28, thereby insuring accurate color registration.

Figure 5:
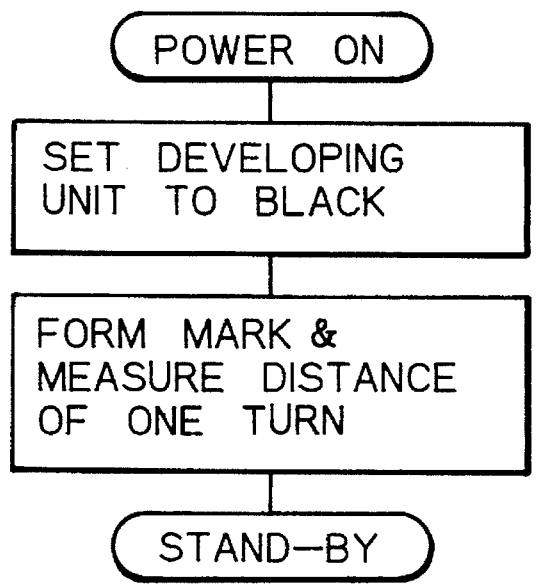
FIG. 5 is a flowchart representative of a specific operation of the embodiment following the start-up of a power source.

FIG. 5 shows a specific operation of the embodiment which begins on the start-up of a power source. As shown, the developing section 7 (or any one of 8, 9 and 10) is set to be black (step A). Then, the mark 28 is formed on the belt 12, and the distance which the belt 12 travels during one turn thereof is measured (step B).

Figure 6A:
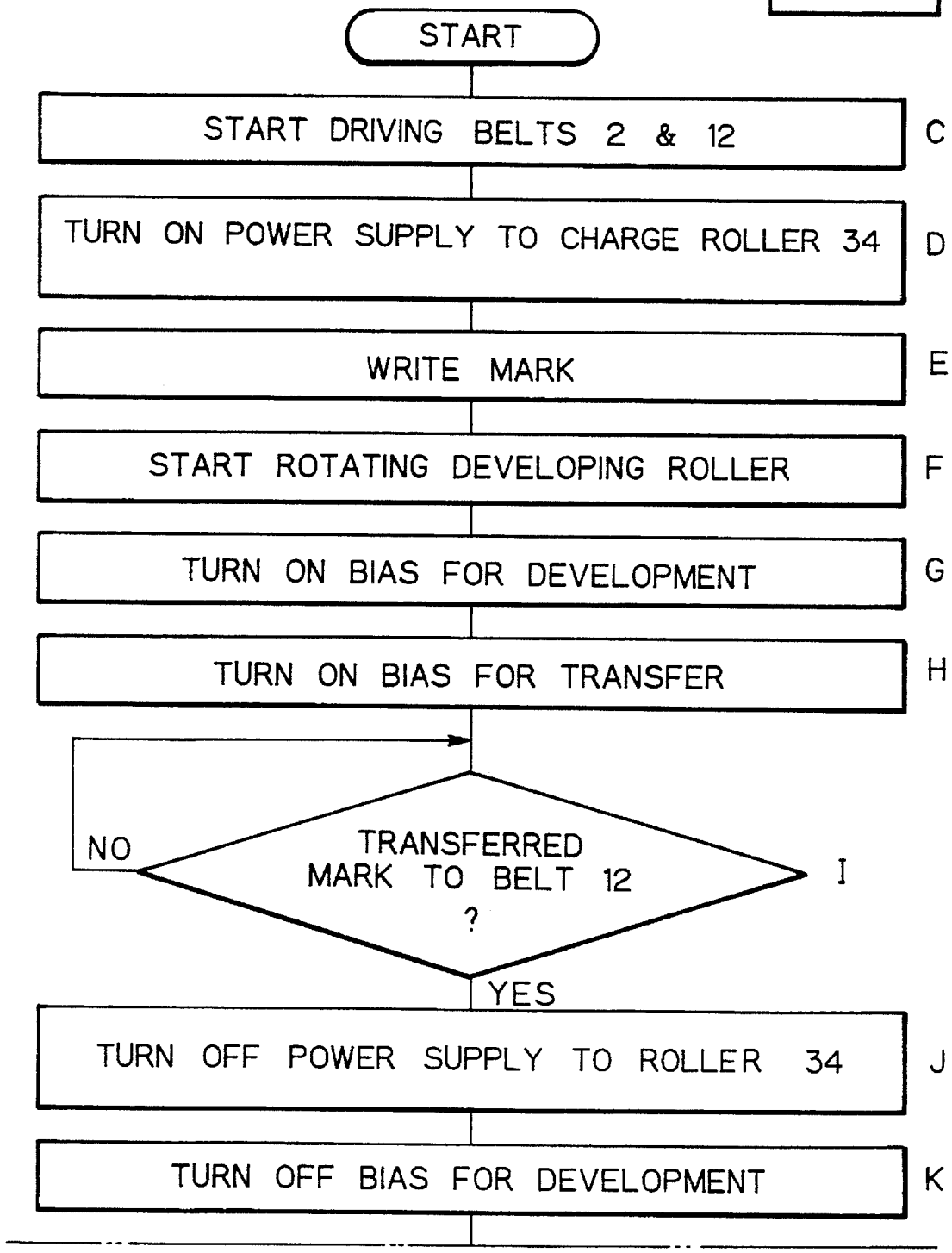
FIG. 6 is a flowchart showing a procedure for measuring a distance which an intermediate transfer belt travels during one turn thereof on the start-up of the power source.
Figure 6B:
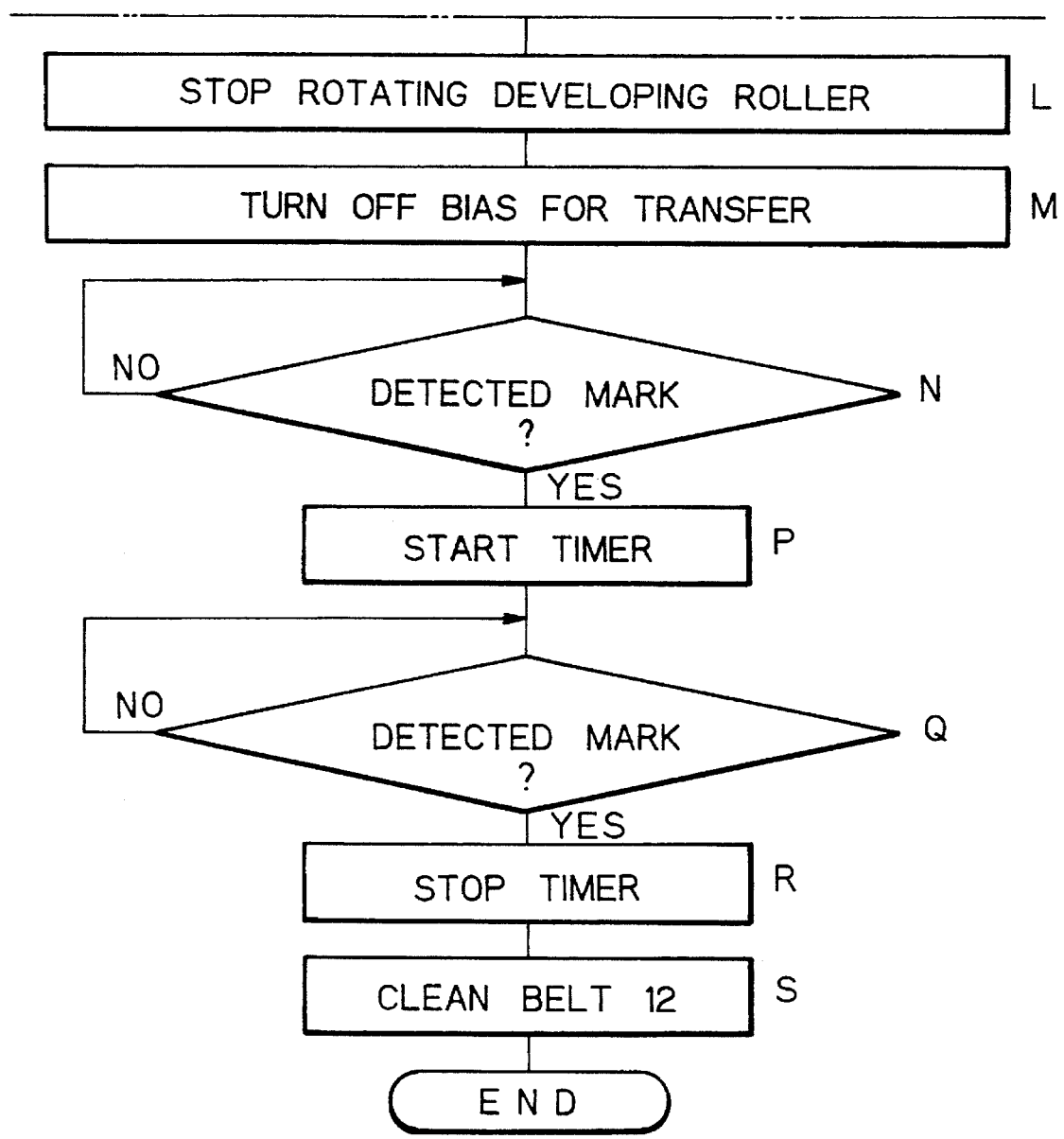

FIG. 6 shows how the distance of one turn of the belt 12 is measured at the start-up of the power source. As shown, the two belts 2 and 12 begin to be driven at the time when the power source is started up (step C). Subsequently, a power source, not shown, associated with the charge roller 34 is turned on (step D). The mark 25 begins to be written in a step E. As the mark 25 is moved, the developing sleeve 7a starts rotating in a step (step F). Then, a bias for development is turned on (step G), and a bias for image transfer is turned on (step H). When the mark 25 is transferred from the belt 2 to the belt 12 to turn out the mark 28 as determined in a step I, the power source of the charge roller 34 is turned off (step J), the bias for development is turned off (step K), the rotation of the sleeve 7a is stopped (step L), and then the bias for image transfer is turned off (step M). In a step N, whether or not the photosensor 29 has sensed the mark 28 is determined. On the detection of the mark 28, the timer 31 starts counting time (step P). After the belt 12 has completed one turn, the photosensor 29 senses the mark 28 again (step Q). Then, the timer 31 stops counting time, and the distance of one turn of the belt 12 is measured on the basis of the value of the timer 31. At this instant, use should preferably be made of a drive motor, not shown, which undergoes a minimum of change in speed. Subsequently, the belt 12 is cleaned to erase the mark 28 (step S). Then, the program returns to the procedure shown in FIG. 5 and awaits another mark forming cycle.

Figure 7B:
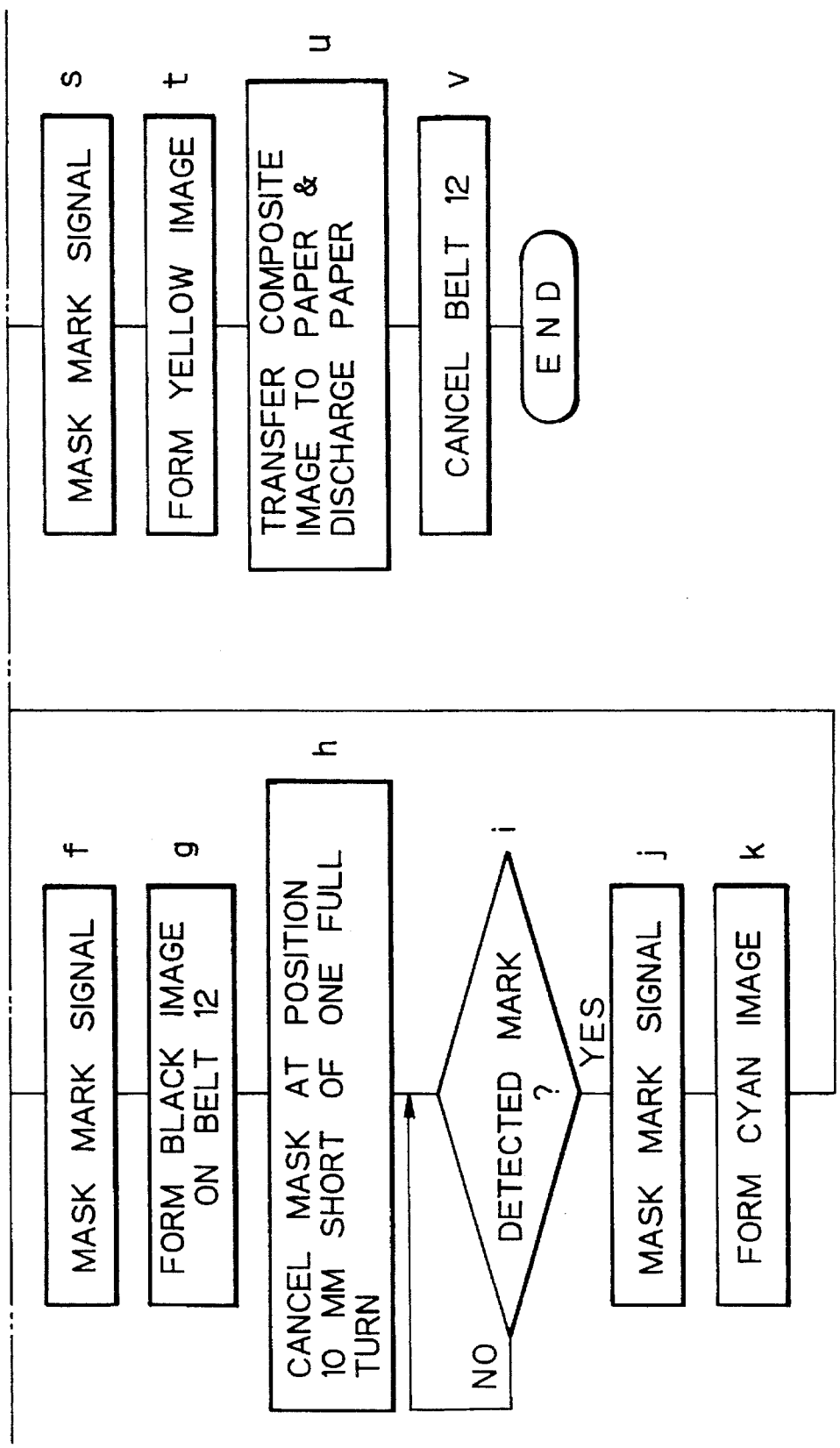
FIG. 7 is a flowchart demonstrating a specific procedure beginning with the start of the reception of image data.

FIG. 7 shows a specific procedure beginning with the reception of image data. As shown, the developing section 7 is set to be black (step a). Then, the mark 28 for generating the write start signal STR is formed on the belt 12, and the belt 12 is brought to a mark position 35, FIG. 2, which is 30 mm short of the mark sensor position (step b). As data is written to a frame memory, not shown (step c), the belt 12 is again rotated (step d). Subsequently, whether or not the mark 28 has been detected is determined (step e). The mask signal MS goes high at the trailing end of the mark 28 (step f), and then a black image is formed on the belt 12 (step g). When the belt 12 reaches a position 10 mm short of the end of one turn, the mask signal MK goes low (step h). Subsequently, the detection of the mark 28 begins (step i). In the same manner, a cyan image (steps j–m), a magenta image (steps n–r) and a yellow image (steps s and t) are transferred to the belt 12 one above another. In a step u, the composite image is transferred from the belt 12 to the paper 19, fixed by the fixing unit 20, and then driven out of the apparatus body. Finally, the belt 12 is cleaned by the belt cleaning device 18 (step v).

In summary, it will be seen that the present invention provides an image forming apparatus having various unprecedented advantages, as enumerated below.

(1) Since the mark 28 is formed in the image forming area of the transfer belt 12, the width of the belt 12 can be reduced, compared to a belt of the kind having a position information area outside the image forming area thereof. This is successful in reducing the overall size of the apparatus. In addition, since the mark 28 is formed by a developer, the belt 12 is free from limitations in respect of position.

(2) The mark 28 is formed for each recording medium. Hence, the area of the belt 12 is used evenly with the result that the life of the belt 12 is increased. The mark 28 is clear-cut since it is formed each time. The procedure can be controlled from the step of forming the mark 28 to the last step, so that the printing time can be controlled with ease.

(3) Since the distance of one turn of the belt 12 is measured on the basis of the mark 28 at least once when the apparatus is started up, the irregularities among the belts 12 and aging thereof can be compensated for. This insures high quality images over a long period of time.

(4) Latent images are sequentially developed, beginning with a color used to form the mark 28 (black in the embodiment). Hence, steps of resetting the developers 7–10 are omitted. As a result, the total printing time of the apparatus is reduced to enhance high-speed operation.

(5) The belt 12 is masked over one turn except for the mark 28 and neighborhood thereof. This prevents mark detection from being influenced by a developed image or a developer left on the belt 12, thereby bringing the individual color images into accurate registration.

(6) The beam B1 issuing from the LED 29a and the beam B2 incident to the phototransistor 29b respectively have diameters $\Phi 1$ and $\Phi 2$ which are greater than the diameter of the beam a for writing an image. Therefore, the influence of the edges of the developed mark 28 is leveled off and eliminated, so that the individual color images can be transferred in accurate register. Further, by making the spot diameter $\Phi 2$ smaller than the spot diameter $\Phi 1$, it is possible to reduce the change in the quantity of light attributable to the eccentricity of the rollers 13 and 14 over which the belt 12 is passed.

(7) Since the mark 28 is fed to a position short of the position where the photosensor 29 is located beforehand, the interval between a print enable condition and a write start state, i.e., waiting time, is reduced. This is also successful in reducing the total printing time and, therefore, in enhancing high-speed operation.

Various modifications will become possible for those skilled in the art after receiving the teachings of the present disclosure without departing from the scope thereof.

What is claimed is:

1. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt; and starting means for starting the operation of the latent image forming means for forming a latent image on said photoconductive element in response to said detection signal fed from said position information detecting unit.

2. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt;

starting means for starting said photoconductive element in response to said detection signal fed from said position information detecting unit; and control means for forming said position information portion on said intermediate transfer belt for each recording medium.

3. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt;

starting means for starting said photoconductive element in response to said detection signal fed from said position information detecting unit; and distance measuring means for forming at least one position information portion on said intermediate transfer belt at least once when said apparatus is started up, and measuring, based on said position information portion, a distance which said intermediate transfer belt travels during one turn thereof.

4. An apparatus as claimed in claim 3, further comprising masking means for masking said intermediate transfer belt except for said position information portion and neighborhood thereof on the basis of the distance measured by said measuring means.

5. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt;

starting means for starting said photoconductive element in response to said detection signal fed from said position information detecting unit; and order determining means for effecting image formation with, at first, a developer of a color used to form said position information portion.

6. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt;

starting means for starting said photoconductive element in response to said detection signal fed from said position information detecting unit; and wherein said position information detecting unit emits a beam greater in spot diameter than a beam for writing image data on said photoconductive element.

7. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt;

starting means for starting said photoconductive element in response to said detection signal fed from said position information detecting unit; and wherein a beam incident to said position information detecting unit is smaller in spot diameter than a beam issuing from said position information detecting unit.

8. A color image forming apparatus comprising:

a photoconductive element;

latent image forming means for selectively forming on said photoconductive element latent images respectively corresponding to images of particular colors and a position mark latent image representative of position information;

a developing unit developing said latent images with developers of respective colors to thereby produce corresponding color images, and developing said position mark latent image to thereby produce a position mark;

an intermediate transfer belt for causing the color images to be transferred thereto one above another and then transferred therefrom to a recording medium, and causing said position mark to be transferred thereto to form a position information portion;

a position information detecting unit generating a detection signal on detecting said position information portion formed on said intermediate transfer belt;

starting means for starting said photoconductive element in response to said detection signal fed from said position information detecting unit; and control means for starting writing said position information portion before image data begins to be written and after said intermediate transfer belt has been fed to a position short of a position where said position information detecting unit is located.

9. A method of forming a color image formed on a photoconductive element, comprising the steps of:

selectively forming on said photoconductive element latent images respectively corresponding to images of particular colors and a position mark latent image representative of position information;

developing said latent images with developers of respective colors to thereby produce corresponding color images, and developing said position mark latent image to thereby produce a position mark;

causing the color images to be transferred onto an intermediate transfer belt one above another and then transferred therefrom to a recording medium, and causing said position mark to be transferred thereto to form a position information portion;

generating a detecting signal on detecting said position information portion formed on said intermediate transfer belt; and starting the operation for forming the latent images on said photoconductive element in response to said detection signal.

* * * * *